UNITED STATES PATENT OFFICE.

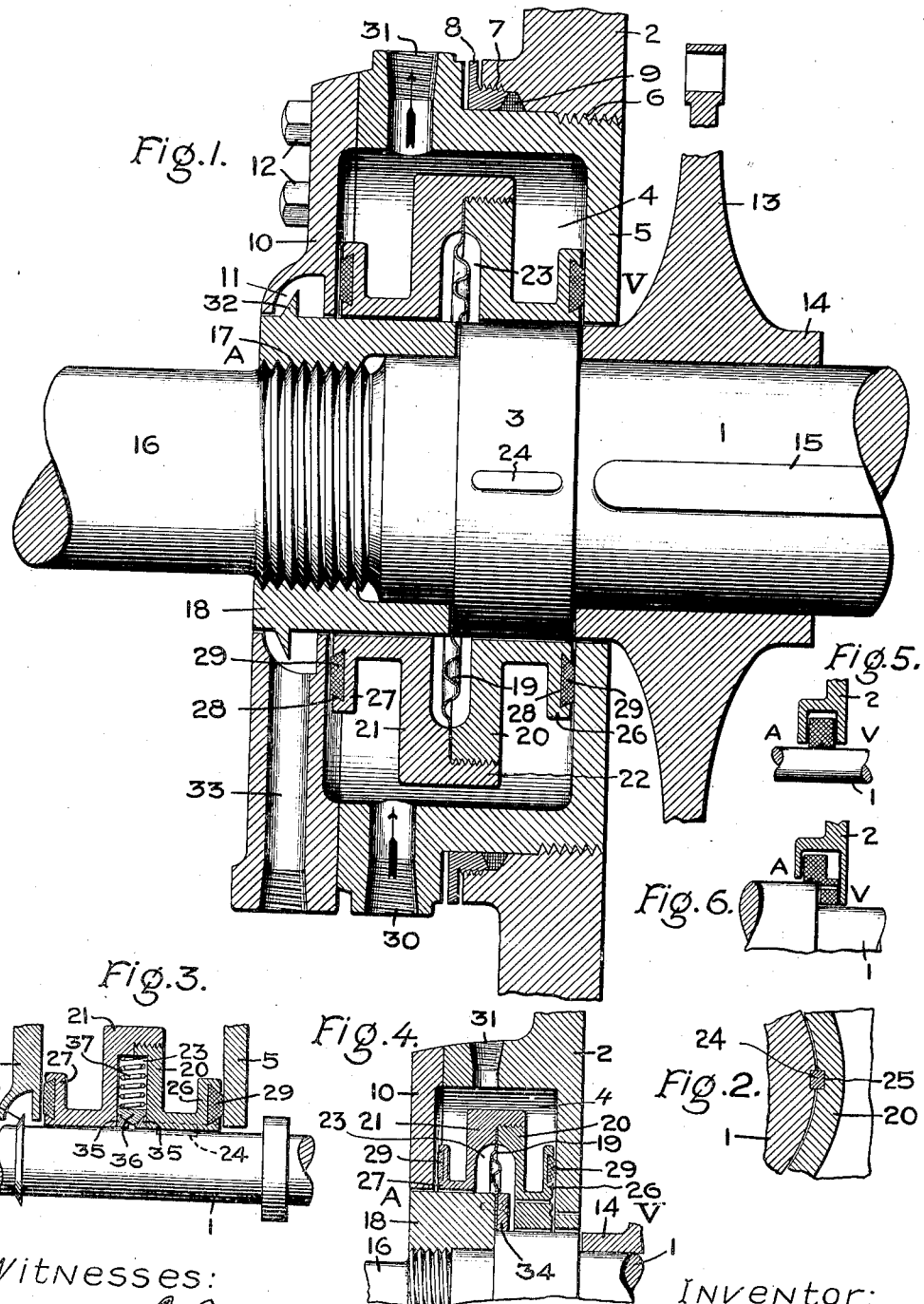

JAMES WILKINSON, OF SCHENECTADY, NEW YORK, ASSIGNOR TO GENERAL ELECTRIC COMPANY, A CORPORATION OF NEW YORK.

SHAFT-PACKING.

1,063,633.  Specification of Letters Patent.  Patented June 3, 1913.

Application filed October 14, 1911. Serial No. 654,721.

*To all whom it may concern:*

Be it known that I, JAMES WILKINSON, a citizen of the United States, residing at Schenectady, county of Schenectady, State of New York, have invented certain new and useful Improvements in Shaft-Packing, of which the following is a specification.

My invention relates to a packing for rotating shafts, which is particularly adapted to pack low speed shafts of large diameter either against the atmosphere or against stage pressures in a turbine.

It is not practicable to pack large diameter shafts with relatively moving parts in metallic contact, on account of the danger of overheating and buckling the parts, nor with centrifugal liquid sealing devices, since the low speed of rotation will require too great a radial thickness of ordinary liquid to seal against even light pressures.

To attain, by mechanical devices, a packing which shall possess the advantages of the liquid seal, such as free radial and axial adjustment, without being subject to metallic contact when the parts get out of accurate alinement radially or axially, is one of the chief objects of my invention. To this end I provide a rotatable packing element or clearance ring driven by the shaft with which it has a slip connection of such a character as to permit the element to move axially without being thrown off radially or eccentric to the shaft, and to move freely radially with the shaft. The element has two radial faces which just clear the side walls of the liquid holding chamber within which it rotates. The preferred form of packing used to prevent leakage between the element and shaft, and constituting a distinct improvement, comprises a flexible diaphragm connected to the shaft and packing element and adapted to prevent leakage while permitting the packing element to shift axially on the shaft to compensate for slight changes in alinement of the parts at this point without causing a greater contact pressure at the clearances, than that required to shift the ring.

It is a further object to adapt this rotating packing element to be acted upon by the pressures between which it operates in such manner that one of its clearance surfaces may be held in light contact with the side of the chamber by any desired fraction of the pressure per square inch packed against. This is effected by so constructing the element that it may be balanced between the different pressures or unbalanced to any desired extent. This is important since the element, while thus held to its seat with the desired force, is still free to move axially on, or radially with the shaft without affecting the pressure of contact.

A further object of my invention is to provide means to cool and lubricate such a rotatable mechanical packing by supplying the packing chamber, in which the packing ring or element rotates, with a liquid, preferably water, which may be circulated therethrough to carry off any heat due to friction of the contact surfaces and lubricate them. If desired, the packing chamber may also be adjustable axially of the shaft, the cooling liquid or water being circulated through this chamber in any desired manner.

My invention further comprises improvements in the details of construction and arrangement of parts, which in their preferred form are illustrated in the accompanying drawings, wherein:—

Figure 1, is a vertical sectional view taken through my improved packing as applied to the shaft of an elastic fluid turbine; Fig. 2, is a partial sectional view illustrating the manner in which the packing is splined to the shaft; Fig. 3, illustrates a modification in the form of a mechanical packing applied between the rotatable packing and shaft; Fig. 4, illustrates a modification of Fig. 1, in which the pressure thrust against the packing is equalized, thus eliminating the bearing pressure at the packing surfaces, and Figs. 5 and 6, are graphical illustrations of the forces acting upon the different forms of packings shown in Figs. 1 and 4 respectively.

My invention is particularly, though not exclusively, adapted to elastic fluid turbines and is shown applied to a turbine shaft 1, which passes through the head or casing 2 at the supply or exhaust end of the turbine. The shaft is provided with an integral collar 3 disposed opposite an annular packing containing a chamber 4 formed in an integral casing 5 threaded at 6 into a flanged opening in the head 2. This opening in the casing is also threaded at 7 to receive a threaded packing gland 8, which compresses a soft packing 9 between the shell 5 and the head or casing to prevent leakage past the threaded joint 6. The packing chamber 4 is closed at its outer side by an end plate 10 which is bolted to the casing 5 and formed with an annular chamber 11, which opens toward and adjacent to the shaft. The end plate 10 is preferably split and the sections thereof are connected to the casing 5 by cap screws 12. The turbine may be provided with one or more bucket wheels, such as 13, which has a hub 14 that abuts the collar 3 and preferably stands flush therewith. The wheel or wheels are held on the shaft by a key 15 inserted in a seat in the shaft. The outer end of the shaft is reduced at 16 and provided with a threaded portion 17 on which is screwed a nut 18. The inner end of the nut is adapted to engage the outer face of the collar 3 so as to clamp and securely hold the inner edge of a circular, solid, corrugated copper diaphragm 19. This diaphragm is clamped at its periphery between the heads 20 and 21 forming the packing element proper. These disks are substantially similar with the exception that the disk 21 has a flange 22 internally threaded and into which the threaded periphery of the disk 20 is adapted to be secured. The adjacent faces of the two disks are annularly grooved to form a chamber 23 in which the diaphragm 19 is disposed, the periphery of the diaphragm being clamped between the engaging parts of the rings 20 and 21. If desired, packing may be interposed between the engaging faces of the rings and diaphragm, and also between the nut 18 and collar 3 and the diaphragm. The purpose of this is to provide a mechanical packing in the form of a flexible fluid tight connection which will prevent leakage between the shaft and the packing element and which will serve the additional and important function of causing the packing to give or slip axially on the shaft without affecting the bearing pressure and to automatically resume its initial position when the pressure, before which it yields, is relieved.

The packing element, which is annular in form, is connected to the collar 3 by means of an axially disposed spline 24 disposed in a groove in the collar and adapted to engage in a groove 25 in the packing element to constitute the positive driving connection between the shaft and packing element. The diaphragm and the spline connect the packing element to the shaft so that it rotates with it and at the same time is axially adjustable thereon.

The packing element, which is of greatest diameter opposite the chamber 23, rotates in close proximity to the inner annular wall of the packing chamber 4. The disks 20 and 21 are provided with oppositely disposed sleeve extensions which terminate in radially disposed annular flanges 26 and 27 provided each with an annular dovetailed channel or groove 28 in its outer face opposite the adjacent side wall of the packing chamber. These channels or grooves are adapted to receive an annular metallic packing ring 29, preferably of antifriction metal, or it may be made of carbon. These annular packing rings, which constitute the working surfaces of the packing, are so disposed between the side walls of the packing chamber as to leave a slight axial clearance for passage of water, while one or the other may be in light frictional contact with a side wall of the chamber.

The packing chamber 4 is provided with an inlet opening 30 and an outlet opening 31, by means of which water or other cooling liquid may be introduced into the chamber and, if desired, circulated therethrough and around the packing element for the purpose of sealing the clearances, lubricating any rubbing surfaces and keeping the packing cool. The annular chamber 11, formed in the end plate 10, will catch the fluid tending to leak between the flange 27 and the casing, there being a slight clearance at this point. A centrifugal thrower 32 on the nut 18 catches this leaking liquid and causes it to pass off through a water drip passage 33, also formed in this plate 10. The water or cooling liquid in the chamber is normally at about atmospheric pressure.

Assuming that the packing shown in Fig. 1. is placed at the low pressure end of the shaft of a condensing engine, the exhaust pressure or vacuum, represented by the letter V, will pass between the element and the collar 3 and enter the right-hand compartment of the chamber 23. In the same way the atmospheric pressure A will have access to the left-hand compartment of said chamber, leakage between these compartments being prevented by the diaphragm 19. Assuming that any thrust of pressure A against the diaphragm is equalized by an equal amount of pressure against a side wall of chamber 23, and that the liquid in the chamber exerts equal pressure around the outside of the element or disks, it follows that the difference in the pressures acting on the flanges 26 and 27 determines the pressure per square inch with which the inner packing ring 29 is forced in an axial direction against the casing. This may be clearly seen by reference to the graphical illustration in Fig. 5, which represents the action of the pressures on the packing rings in Fig. 1.

In Fig. 4, I show a modified design of the packing element, according to which the packing chamber 4 is formed in the casing 2 and the nut 18 is made of larger diameter than the collar 3. The diaphragm 19 is gripped to its inner face by a ring 34 which is fastened to the nut by screws as shown. This necessitates the ring 21 being of less radial width than the ring 20, thereby throwing the clearance faces or flanges 26 and 27 out of alinement. In this construction the action of the pressures A and V on the packing element are shown in Fig. 6, where it will be seen that the end thrust of the rings is practically equalized. By thus varying the surface areas of the element exposed to different pressures or a difference in pressure, its end thrust may be equalized so that the ring rests free of pressure in contact with the casing surfaces and a slight leakage of water will staunch or pack both joints. The packing element fits the shaft and ring just tight enough to slip easily thereon without danger of being thrown out of balance or eccentric to the shaft by centrifugal motion. The slight axial adjustment thus provided avoids the danger of a rigid mechanical contact under high pressure at the working surfaces, which are kept cool and lubricated by the water in the packing chamber. The diaphragm 19, which prevents any leakage between the compartments of chamber 23, and between the element and shaft, has sufficient flexibility with slight pressure to permit of the element adjusting itself under normal conditions.

In Fig. 3, I illustrate a modified form of mechanical packing between the packing element and shaft which comprises two packing rings 35, having reversely beveled faces which are engaged by a split ring 36, wedge shaped in cross section and forced against the rings 35, by the coiled springs 37 in the chamber 23. These springs counteract centrifugal force on ring 36 and press the packing rings against the shaft so as to practically stop leakage. Any other kind of packing unaffected by centrifugal force may be used at this point.

The casing 5 may be screwed in or out and adjusted axially in the head 2 so as to increase the adaptability of the packing to different working conditions.

My invention is applicable to pack rotating shafts generally, but it is of greatest use in connection with turbine shafts of large diameter and low speed.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In a packing, a packing chamber, a rotatable packing element, a shaft on which said element is adjustably mounted, and a flexible fluid tight driving connection between said element and shaft, which permits the said element to move axially on said shaft.

2. The combination with a rotatable shaft, of a packing therefor, comprising a packing chamber, an internally chambered packing element mounted with a slip fit on a shaft and disposed in said chamber, a flexible diaphragm clamped to the shaft and to the annular wall of said chamber in the element, and a positive driving connection between the shaft and element which permits the latter to slip axially.

3. The combination with a rotatable shaft, of a packing therefor comprising a stationary element, a packing element coöperating therewith and divided into two parts or sections in a radial plane, said parts being cut away to form a chamber between them, a circular flexible diaphragm connected by a fluid tight joint to said shaft, said diaphragm being disposed in said chamber in the element and clamped at its periphery between the sections of said element, and means to join said sections together.

4. The combination with a rotatable shaft, of a packing comprising a packing element mounted with a slip fit on said shaft and rotatable therewith, said element being axially adjustable on said shaft, an internal chamber in said element, and packing means which divides the chamber into two parts, prevents leakage between the element and shaft, and acts independently of centrifugal force.

5. The combination with a rotating shaft, of a packing comprising a chamber, an element in the chamber that is mounted with a slip fit on said shaft, means to rotate said element with said shaft, and surfaces at the ends of said element which clear the side walls of said chamber, and liquid means to seal said clearances.

6. The combination with a rotating shaft, of a packing comprising a rotatable element yieldingly mounted thereon and provided with working surfaces at each end, and a packing chamber with the walls of which said working surfaces co-act, and which is filled with water to cool and lubricate said surfaces.

7. The combination with a rotating shaft, of a packing therefor comprising a packing chamber surrounding the shaft and filled with liquid at low pressure, a rotatable packing element which runs in the liquid in said chamber and is mounted with a slip fit on said shaft, said element being more or less unbalanced according to its design by end pressures thereon and held to its work by the resulting end thrust, and packing means to prevent leakage between the element and shaft.

8. The combination with a rotating shaft, of a packing therefor comprising a packing chamber surrounding the shaft, a rotatable packing element disposed in said chamber and mounted with a slip fit on said shaft, said element running in water in said chamber and being more or less unbalanced by end pressures according to its design and held to its work by the resulting end thrust, and packing means, to prevent leakage between the ring and shaft, which acts independently of centrifugal force.

9. In a packing, the combination with a rotatable shaft, of a packing chamber, a packing element therein which leaves a slight axial clearance between its side or sides and said chamber, and a circumferential clearance between the periphery of the element and chamber which is filled with water, means to connect said element to said shaft so that it is axially adjustable thereon and rotates therewith, and means to supply water to said circumferential clearance.

10. The combination with a rotating shaft, of a packing therefor comprising a packing element rotatable with said shaft and axially adjustable thereon, a stationary seat for said element, and a spring connection between said element and shaft which holds said element yieldingly against said seat and prevents leakage between said element and shaft.

11. The combination with a rotating shaft, of a packing therefor comprising a rotatable sleeve mounted with a slip fit on said shaft and provided with end flanges, annular contact surfaces of antifriction metal carried by said flanges, a chamber in which said sleeve rotates, stationary seats for said surfaces, and means to supply water to said chamber.

12. The combination with a rotating shaft, of a packing therefor comprising an element rotatable with the shaft and axially adjustable thereon, a packing chamber within which said element rotates and which is provided with a stationary seat on each side of said element, means to yieldingly force said element against one of said seats, means to circulate water in said chamber, and means to catch and carry off the water which leaks between the element and the other seat.

13. The combination with a rotating shaft, of a packing chamber surrounding said shaft, a packing element disposed within said chamber, said element being unbalanced by the end pressures thereon and forced against one side of said chamber as a seat, means to unbalance said element to a less extent than the area of its contact surface, and driving means between the shaft and element to permit the latter to yield axially on the shaft.

14. The combination with a rotating shaft, of a stationary casing surrounding the shaft and provided with an internal chamber, a packing element in the chamber that is mounted on the shaft to rotate therewith and to move longitudinally thereon, said element having end flanges adjacent to the end walls of the chamber and an internal chamber intermediate its ends that is transverse to the shaft, and a flexible diaphragm that extends across the chamber dividing it into two parts and is secured at its inner and outer edges to the shaft and the element respectively, the element being movable axially so as to bring its flanges into packing relation to said walls.

In witness whereof, I have hereunto set my hand this 13th day of October, 1911.

JAMES WILKINSON.

Witnesses:
 HELEN ORFORD,
 BENJAMIN B. HULL.